US012585641B2

(12) United States Patent

Nguyen et al.

(10) Patent No.: US 12,585,641 B2

(45) Date of Patent: Mar. 24, 2026

(54) GENERATIVE ARTIFICIAL INTELLIGENCE BASED CONVERSION OF NATURAL LANGUAGE REQUESTS TO DATA WAREHOUSE QUERY INSTRUCTION SETS

(71) Applicant: Intuit Inc., Mountain View, CA (US)

(72) Inventors: Tin Nguyen, Fremont, CA (US); Sayan Paul, Sunnyvale, CA (US); Lin Tao, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 250 days.

(21) Appl. No.: 18/375,234

(22) Filed: Sep. 29, 2023

(65) Prior Publication Data

US 2025/0110948 A1     Apr. 3, 2025

(51) Int. Cl.
G06F 16/242 (2019.01)
G06F 16/28 (2019.01)

(52) U.S. Cl.
CPC .......... G06F 16/243 (2019.01); G06F 16/283 (2019.01)

(58) Field of Classification Search
USPC .......................................................... 707/713
See application file for complete search history.

(56) References Cited

U.S. PATENT DOCUMENTS

| | | | | |
|---|---|---|---|---|
| 10,817,527 | B1 * | 10/2020 | Setlur .................... | G06F 16/243 |
| 11,960,500 | B1 * | 4/2024 | Sboychakova ......... | G06F 40/20 |
| 12,197,452 | B1 * | 1/2025 | Merchant .............. | G06F 16/243 |
| 12,217,029 | B1 * | 2/2025 | Andre ........................ | G06F 8/35 |
| 12,271,698 | B1 * | 4/2025 | Wang ................ | G06F 16/24522 |
| 2018/0349343 | A1 * | 12/2018 | Bull ........................ | G06F 16/243 |
| 2019/0043483 | A1 * | 2/2019 | Chakraborty ......... | G10L 15/063 |
| 2019/0180258 | A1 * | 6/2019 | Amar ........................ | H04L 51/02 |
| 2019/0325498 | A1 * | 10/2019 | Clark ................ | G06Q 30/0643 |
| 2020/0142888 | A1 * | 5/2020 | Alakuijala ............ | G06F 16/242 |
| 2020/0184278 | A1 * | 6/2020 | Zadeh .................... | G06N 3/044 |
| 2021/0158176 | A1 * | 5/2021 | Wan ........................ | G06F 18/22 |
| 2022/0318860 | A1 * | 10/2022 | Dorch .................... | G10L 15/28 |
| 2023/0078177 | A1 * | 3/2023 | Wang .................... | G06F 16/243 707/760 |
| 2023/0205824 | A1 * | 6/2023 | Jablokov ................ | G06F 16/93 707/737 |
| 2023/0281230 | A1 * | 9/2023 | Kukla .................... | G06F 16/93 707/722 |

(Continued)

*Primary Examiner* — Cam Linh T Nguyen

(74) *Attorney, Agent, or Firm* — Paradice & Li LLP

(57) ABSTRACT

Systems and methods are disclosed for converting natural language queries to a query instruction set for searching a data warehouse. To generate a query instruction set from a natural language query, a system iteratively uses a generative artificial intelligence (AI) model and database query tools to generate a query instruction set in a stepwise manner. The system and generative AI model do not require a priori knowledge of data table contents in the data warehouse, which may include sensitive information. In addition, the system does not require access to the data warehouse to generate the query instruction set. Instead, the system is implemented to use structure information from the data warehouse, including table lists (such as table names) and table format information (such as column names) of tables in the data warehouse, and the generative AI model is a generally trained model to generate the query instruction set.

18 Claims, 7 Drawing Sheets

500

(56) References Cited

U.S. PATENT DOCUMENTS

| | | | | |
|---|---|---|---|---|
| 2024/0112074 A1* | 4/2024 | Chisholm | | G06N 20/00 |
| 2024/0126795 A1* | 4/2024 | Zhong | | H04L 51/02 |
| 2024/0202461 A1* | 6/2024 | Pagnoni | | G06F 16/345 |
| 2024/0289407 A1* | 8/2024 | Rofouei | | G06F 16/9577 |
| 2024/0296294 A1* | 9/2024 | Imani | | G06F 16/3325 |
| 2024/0296295 A1* | 9/2024 | Russell | | G06F 40/56 |
| 2024/0311546 A1* | 9/2024 | Maschmeyer | | G06F 40/166 |
| 2024/0354436 A1* | 10/2024 | Mukherjee | | G06F 16/3344 |
| 2024/0354710 A1* | 10/2024 | Logiotatidis | | G06F 40/205 |
| 2024/0411813 A1* | 12/2024 | Yim | | G06F 40/30 |
| 2025/0068627 A1* | 2/2025 | Hoang | | G06F 16/24573 |

* cited by examiner

300

| Store, in a local storage, a table description of a plurality of tables stored in a remote data warehouse. 302 |
| --- |

↓

| Obtain, by an interface, a natural language query as an input for querying the remote data warehouse. 304 |
| --- |

↓

| Generate, using one or more database query tools, a final query instruction set for querying the remote data warehouse from the natural language query based on the stored table description. 306 |
| --- |
| The one or more database query tools are prevented from accessing the remote data warehouse to generate the final query instruction set. 308 |

↓

| Output, via the interface, the final query instruction set. 310 |
| --- |

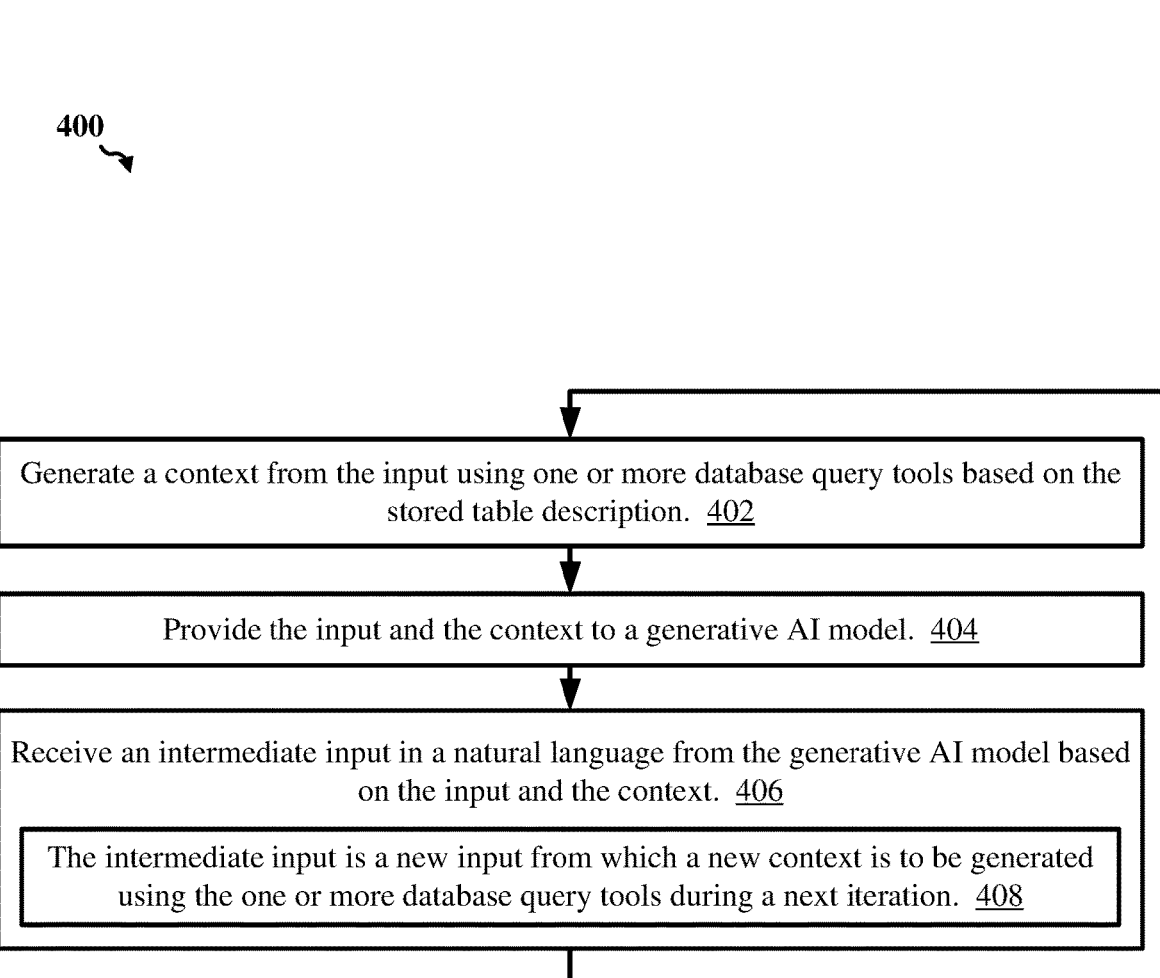

Generate a context from the input using one or more database query tools based on the stored table description. 402

Provide the input and the context to a generative AI model. 404

Receive an intermediate input in a natural language from the generative AI model based on the input and the context. 406

The intermediate input is a new input from which a new context is to be generated using the one or more database query tools during a next iteration. 408

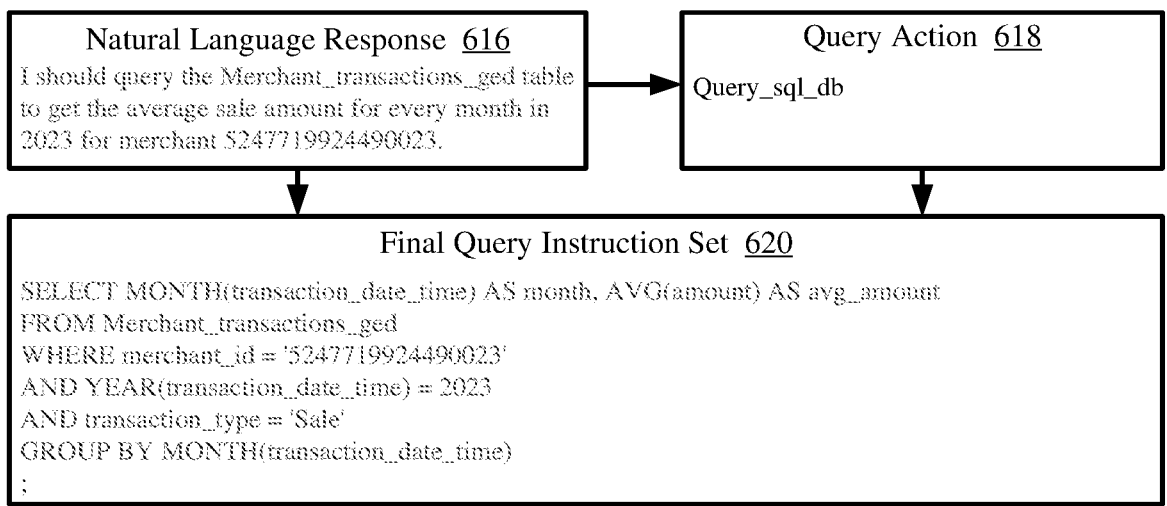

| Natural Language Response 616 | Query Action 618 |
|---|---|
| I should query the Merchant_transactions_ged table to get the average sale amount for every month in 2023 for merchant 5247719924490023. | Query_sql_db |

Final Query Instruction Set 620

SELECT MONTH(transaction_date_time) AS month, AVG(amount) AS avg_amount
FROM Merchant_transactions_ged
WHERE merchant_id = '5247719924490023'
AND YEAR(transaction_date_time) = 2023
AND transaction_type = 'Sale'
GROUP BY MONTH(transaction_date_time)
;

Figure 6 (cont.)

GENERATIVE ARTIFICIAL INTELLIGENCE BASED CONVERSION OF NATURAL LANGUAGE REQUESTS TO DATA WAREHOUSE QUERY INSTRUCTION SETS

TECHNICAL FIELD

This disclosure relates generally to the automatic creation of query instructions for databases or warehouses, including the use of generative artificial intelligence and database query tools to convert natural language requests to data warehouse query instruction sets.

DESCRIPTION OF RELATED ART

A data warehouse can store a large data pool for various individuals or businesses. For example, an internet service provider (ISP) may store user information, network information, and other information concerning the ISP in a data warehouse. In another example, a university may store student information, course information, and other information concerning the university. Various other data warehouses exist to store and organize various types of electronic data. The data warehouse is searchable for desired information based on query instructions input to an interface of the data warehouse and in a format readable by the data warehouse (such as any Structured Query Language (SQL)). To search the data warehouse, an individual generates a set of query instructions (such as SQL instructions) to cause the data warehouse to provide the desired information.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

Systems and methods are disclosed for automatically converting natural language requests for querying a data warehouse into computer readable query instruction sets. In particular, a system is configured in such a manner to generate query instruction sets from natural language requests without requiring knowledge of the contents of the data warehouse to be queried. In this manner, sensitive information that may be stored in the data warehouse is not required to be exposed in order to generate the query instruction sets. Instead, the system is implemented to use structure information from the data warehouse, including table lists (such as table names) and table format information (such as column names) of tables in the data warehouse. Such a system includes various database query tools (which includes a natural language processing (NLP) model) that are configured to iteratively generate query instructions of the set from the natural language request. To iteratively generate the query instructions, the system uses a generative artificial intelligence (AI) model to generate natural language responses processed by the database query tools to generate new query instructions of the set during the iterations. The generative AI model is a generally trained model to generate the query instruction set, thus not requiring a priori information regarding the data warehouse. In this manner, the system iteratively uses the generative AI model and database query tools to generate a query instruction set in a stepwise manner without requiring exposure of data warehouse contents to generate such a query instruction set.

One innovative aspect of the subject matter described in this disclosure can be implemented as a computer-implemented method for converting a natural language query to computer readable instructions for generating computer readable instructions to query a data warehouse. The method includes storing, in a local storage, a table description of a plurality of tables stored in a remote data warehouse. The method also includes obtaining, by an interface, a natural language query as an input for querying the remote data warehouse. The method further includes generating, using one or more database query tools, a final query instruction set for querying the remote data warehouse from the natural language query based on the stored table description. The one or more database query tools are prevented from accessing the remote data warehouse to generate the final query instruction set. The method also includes outputting, via the interface, the final query instruction set. In some implementations, generating the final query instruction set includes iteratively performing the following operations: generating a context from the input using one or more database query tools based on the table description; providing the input and the context to a generative artificial intelligence (AI) model; and receiving an intermediate input in a natural language from the generative AI model based on the input and the context (with the intermediate input being a new input from which a new context is to be generated using the one or more database query tools during a next iteration).

Another innovative aspect of the subject matter described in this disclosure can be implemented in a system for generating computer readable instructions to query a data warehouse. An example system includes one or more processors, an interface, one or more database query tools, and a memory. The memory stores a table description of a plurality of tables stored in a remote data warehouse. The memory also stores instructions that, when executed by the one or more processors, cause the system to perform operations. The operations include obtaining, by an interface, a natural language query as an input for querying the remote data warehouse. The operations further include generating, using one or more database query tools, a final query instruction set for querying the remote data warehouse from the natural language query based on the stored table description. The one or more database query tools are prevented from accessing the remote data warehouse to generate the final query instruction set. The operations also include outputting, via the interface, the final query instruction set. In some implementations, generating the final query instruction set includes iteratively performing the following operations: generating a context from the input using one or more database query tools based on the table description; providing the input and the context to a generative AI model; and receiving an intermediate input in a natural language from the generative AI model based on the input and the context (with the intermediate input being a new input from which a new context is to be generated using the one or more database query tools during a next iteration).

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 3 shows an illustrative flow chart of an example operation of generating a query instruction set from a natural language request, according to some implementations.

FIG. 4 shows an illustrative flow chart of an example operation to be iteratively performed in generating a query instruction set from a natural language request, according to some implementations.

Like numbers reference like elements throughout the drawings and specification.

DETAILED DESCRIPTION

Figure 1:
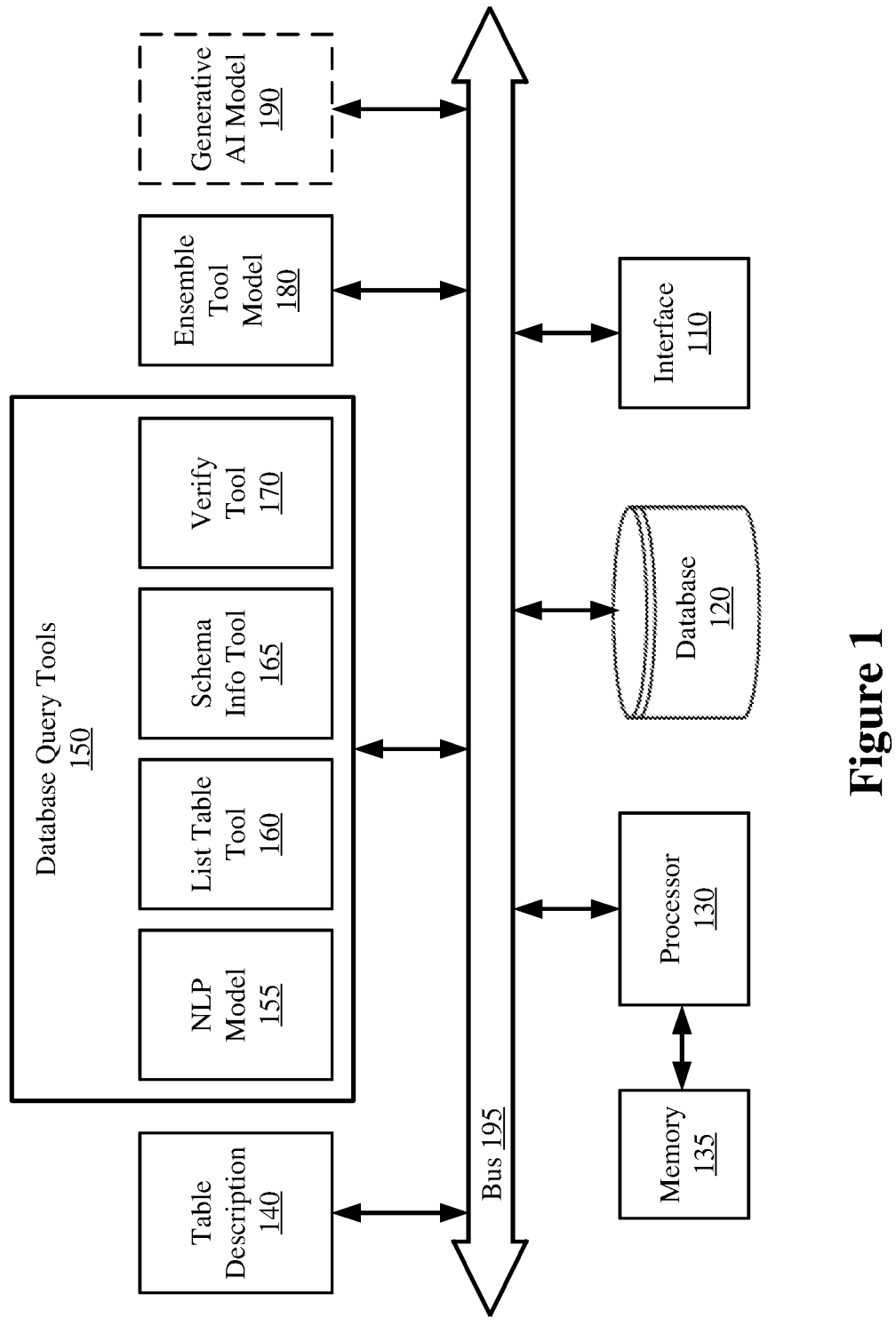
FIG. 1 shows an example system for generating a query instruction set from a natural language request, according to some implementations.

Implementations of the subject matter described in this disclosure may be used for the creation of query instructions for databases or warehouses from a natural language request, including the use of generative artificial intelligence (AI) and database query tools to convert natural language requests to data warehouse query instruction sets.

As used herein, a data warehouse includes a storage storing current and/or historical data and having a defined schema to organize such data. The schema is described herein as the data in the data warehouse being organized in searchable tables. Typically, if a user desires to search a data warehouse for specific data, the user generates a query instruction set including query instructions in a language format executable by the data warehouse to provide the desired information. For example, many databases and data warehouses are configured to execute instructions in a structured query language (SQL) format, and the user generates a set of SQL instructions to be executed by the data warehouse to receive the desired information from the data warehouse.

In a specific example, a data warehouse for a company may store historic and current information regarding various customers of the company. A customer may wish to receive specific data from its historic information and call the company for such. For example, the customer may be a small business that requests historic information regarding its liabilities over the past 24 months and contact customer service or support to obtain such. The customer service or support specialist that assists the customer would need to generate the query instruction set in a suitable computer readable format in order to query the data warehouse to retrieve the liability information for the past 24 months. Alternatively, the specialist would need to approach a technical specialist in generating the query instruction set. In another example, a data warehouse of a geological entity (such as a university or government entity tracking seismic activity in an area, such as the United States Geological Survey (USGS)) may store historical and current data regarding seismic activity for different locations. A scientist may wish to retrieve seismic activity of a specific magnitude range for a specific location over the last 6 months from the data warehouse. To be able to retrieve such information, the scientist must generate the query instruction set or engage with a technical specialist to generate the query instruction set.

One problem in the above examples is that generation of the query instruction set relies on the expertise of the person manually generating such instructions. In addition, the manual generation of query instructions can be time intensive and prone to typographical mistakes intrinsic in the manual generation of computer-readable instructions. As such, there is a need to be able to automatically generate a query instruction set from a natural language request. In this manner, generation of the query instructions may be expedited and may be alleviated from errors attributed to the coding expertise of the individual and the manual generation of code.

Machine learning (ML) models, such as natural language processing (NLP) models, may be trained to generate query instructions from natural language requests. In order to train the ML model, a training set of requests and the associated data to be retrieved for such requests may be used in a supervised learning setting in which the model generates query instructions provided to the data warehouse. In this manner, the ML model may be trained to generate query instruction sets for the data warehouse.

One problem with such a system is that the data warehouse may include sensitive information. For example, a data warehouse for a hospital may include sensitive medical information of patients that cannot be disclosed to third parties. In another example, a data warehouse for a government entity may include personal identifiable information of citizens that is not to be disclosed to others. In a further example, a data warehouse of a company regarding customer data may include sensitive customer information that is to be protected by the company. As such, the data warehouse may be unavailable for training or fine-tuning an ML model to generate query instructions for the data warehouse.

In addition, in the above example of a customer support specialist, while the specialist may have permission to view sensitive data for the specific customer, any other person may not have such permission. As such, the specialist would be required to generate the query instruction set himself without the assistance of a technical specialist knowledgeable in the computer readable language for the data warehouse (such as SQL). Finding and staffing a sufficient number of specialists with sufficient technical expertise may be difficult or even impossible. In addition, technical expertise across such specialists will still vary, which may provide inconsistent experiences for the customers.

As such, there is a need for a system to automatically generate a query instruction set from a natural language request to query the data warehouse, with the system not having access to or knowledge of any sensitive content stored in the data warehouse in generating the query instruction set.

Various implementations of the subject matter disclosed herein provide one or more technical solutions to generating a computer readable data warehouse query instruction set from a natural language request without prior or current access to the data warehouse. In some implementations, a computing system is configured to store, in a local storage, a table description of a plurality of tables stored in a remote data warehouse. The system is also configured to obtain, by an interface, a natural language query as an input for querying the remote data warehouse. The system is to iteratively use a generative artificial intelligence (AI) model and various database query tools to generate a query instruction set from the input based on the stored table description. To generate the query instruction set, the system iteratively: generates a context from the input using one or more database query tools based on the table description; provides the input and the context to the generative AI model; and receives an intermediate input in a natural language from the generative AI model based on the input and the context (with the intermediate input being a new input from which a new context is to be generated using the one or more database query tools during a next iteration). The context may include query instructions generated or intermediate steps to generate the query instructions of the final query instruction set. As such, the one or more database query tools are used to generate the final query instruction set based on the original input from a user, intermediate inputs from the generative AI model, and the table description. In this manner, the computing system is able to use a generative AI model and a stored table description storing basic format information regarding the tables in the data warehouse without accessing the data warehouse itself in order to generate a query instruction set for querying the data warehouse. The system may output the query instruction set, such as providing to an authorized user or device able to access the data warehouse in order to execute the query instruction set to query the data warehouse.

Various aspects of the present disclosure provide a unique computing solution to a unique computing problem that did not exist prior to searchable electronic databases and data warehouses. The use of specific machine learning technology (including natural language processors and generative AI models) to generate machine readable code as described herein cannot be performed in the human mind, much less practically in the human mind, including the use of pen and paper. As such, implementations of the subject matter disclosed herein are not an abstract idea such as organizing human activity or a mental process that can be performed in the human mind. Further, while some examples are described herein to a data warehouse storing date including customers, sales activity, and financial transactions for clarity in explaining aspects of the present disclosure, the present disclosure applies to any data warehouse storing any searchable information. As such, implementations of the subject matter disclosed herein are not considered fundamental economic activity.

As described herein, a specific computing system is implemented to generate a query instruction set for querying a data warehouse from a natural language request. In some implementations, a user types a request in a natural language form for specific data from the data warehouse into a system prompt. To note, "natural language request" may be used interchangeably herein with "natural language query" or similar terms to indicate a text in a natural language format that is to be used in generating a query instruction set to query a data warehouse. The system receives the natural language request and iteratively uses various tools to process the request to generate query instructions and a generative AI model to update the natural language request in a piecewise manner in order to modify or generate new query instructions until a final, valid query instruction set is generated for querying the data warehouse. For example, an example data warehouse stores weather data for various locations, including the daily high and low temperatures of a city X, over the last decade. The data warehouse may include tables organized by location, with the table columns organized by different weather measurements (such as rainfall, humidity, high temperature, low temperature, etc.). The table rows may be organized by the day such weather measurements are made.

A table description may include one or more files or other computer readable objects (referred to herein simply as files) that stores the table formatting information in the data warehouse. The table formatting information may include the table names and table schemata for the tables. For example, the table names may be included in an index of the data warehouse, and a copy of the index may be included in the table description. Regarding the schemata of tables, the table schema of a table may include, e.g., column names, row names, and what type of information is to be stored in the table without including the actual contents of the table. The table schema may also include metadata or any other formatting information regarding the table. In the above example, the table description may include one or more files to store the table names (which correspond to locations), the column names for the tables (which correspond to specific types of measurements), the row names for the tables (which correspond to specific calendar days), and any metadata indicating the organization of the tables. To note, the table description does not include the actual data, such as the specific weather measurements. If the data warehouse was to include sensitive information, the use of such a table description instead of the data warehouse itself would allow any sensitive or private information in the data warehouse to remain hidden from the system generating the query instruction set.

A user may wish to know the average high temperature and low temperature during August for the city based on the last five years of data. For example, the user may input a request, "What is the average high temperature and the average low temperature of city X in August over the last five years?" In generating the final query instruction set, the system may use the one or more database query tools, including a natural language processing (NLP) model, to generate instruction to first list the table names to identify a table corresponding to city X. Then, the system may provide the natural language request as an input and the table name and instruction (and, optionally, other table format information) as context to the generative AI model to determine a next step. The generative AI model may respond with a natural language response, "The data corresponding to daily low temperatures and the daily high temperatures are to be used." The system may process the response to generate an instruction to list the table schema (including the column and row names and formatting) and identify the table columns "Y" for high temperatures and "Z" for low temperatures to be used. The system may provide the response back to the generative AI model as an input with the table schema information and the table column identifiers as context. The generative AI model may then response with a natural language response, "The row information corresponding to the days in August for years 2023, 2022, 2021, 2020, and 2019 are to be used to generate an average." The system may process the new response to generate an instruction identifying the rows "A" with month 08 for years 2023, 2022, 2021, 2020, and 2019 from the table. With the data from the identified rows A for the two identified columns Y and Z of the table for City X to be used to generate the average high and average low temperature for August, and the inputs/responses indicating that an average is to be generated, the system may use the database query tools to generate the query instruction set of (i) access the table for city X; (ii) retrieve column Y, rows A and column Z, rows A; and (iii) average column Y, rows A to generate an average high and average column Z, rows A to generate an average low. The figures, which are described below, depict systems and methods for converting such natural language requests to query instruction sets without requiring the disclosure of contents in the data warehouse to be queried.

FIG. 1 shows an example system 100 for generating a query instruction set from a natural language request, according to some implementations. The system 100 includes an interface 110, a database 120, a processor 130, a memory 135 coupled to the processor 130, a table description 140, database query tools 150 (including a NLP model 155, a list table tool 160, a schema information (info) tool 165, and a verify tool 170), and an ensemble tool model 180. In some implementations, the system 100 also includes a generative AI model 190. Alternatively, the system 100 may interface with a generative AI model, such as via the interface 110. In some implementations, the various components of the system 100 may be interconnected by at least a data bus 195, as depicted in the example of FIG. 1. In other implementations, the various components of the system 100 may be interconnected using other suitable signal routing resources.

The interface 110 may be one or more input/output (I/O) interfaces to receive requests in a natural language to be converted to query instructions to query the data warehouse. The interface 110 may also receive the table description 140 to be stored by the system 100, or receive or provide inputs or outputs for continued operation of the system 100. An example interface may include a wired interface or wireless interface to the internet or other means to communicably couple with other devices. In some implementations, the interface 110 may include an interface with an ethernet cable or a wireless interface to a modem, which is used to communicate with an internet service provider (ISP) directing traffic to and from other devices. If the system 100 is local to a user, the interface 110 may include a display, a speaker, a mouse, a keyboard, or other suitable input or output elements that allow interfacing with the user (such as to receive a natural language query and to provide the query instruction set generated in response).

The database 120 may store information regarding natural language requests to be converted, query instructions generated by the system 100, contexts generated using the database query tools 150, the table description 140, other inputs and outputs for the components 140-190 of the system 100, or other information for operation of the system 100. In some implementations, the database 120 may include a relational database capable of presenting information as data sets in tabular form and capable of manipulating the data sets using relational operators. The database 120 may use a Structured Query Language (SQL) for querying and maintaining the database 120.

The processor 130 may include one or more suitable processors capable of executing scripts or instructions of one or more software programs stored in system 100 (such as within the memory 135). For example, the processor 130 may be capable of executing one or more applications, the database query tools 150, the ensemble tool model 180, and, optionally, the generative AI model 190 (if included in the system 100). The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications, database query tools 150, the ensemble tool model 180, and, if included in the system 100, the generative AI model 190 that may be executed by the processor 130. The memory 135 may also store the table description 140 and inputs, outputs, or other information associated with the components 140-190 of the system 100 or any other data for operation of the system 100. In some implementations, hardwired circuitry may be used in place of, or in combination with, software instructions to implement aspects of the disclosure. As such, implementations of the subject matter disclosed herein are not limited to any specific combination of hardware circuitry and/or software.

The table description 140 is one or more files storing the formatting information of the tables in the data warehouse. In some implementations, the table description includes the table names of the tables in the data warehouse and the table schemata of the tables in the data warehouse. A table schema of a table may include the column names, the row names, what types of information is to be stored in certain tables, columns, rows, or cells, the format of the information to be stored, and any other suitable formatting information that does not include the actual contents of the tables. For example, none of the actual cell contents of any of the tables in the data warehouse is included in the table description. In this manner, the system 100 does not locally store any content of the data warehouse.

The system 100 is remote to the data warehouse, with the system 100 not accessing the data warehouse in any manner to generate the query instruction set from a natural language request. Instead, the system 100 is able to use the locally stored table description 140 to generate the query instruction set to query the remote data warehouse. The table description 140 may be generated at any suitable time. For example, the table description may be periodically generated at the data warehouse, such as every week or every month. Alternatively, a new table description may be generated anytime the data warehouse includes a new table or the table formatting changes. The new table description may be provided to the system 100 via the interface 110 and stored in the database 120 (or another suitable system storage) as the table description 140. The stored table description 140 may organize the formatting data in such a manner that the database query tools 150 may be used to retrieve desired formatting information from the table description 140 to generate the query instructions for querying the remote data warehouse. For example, the table description 140 may include one or more tables organizing the formatting information and that may be accessed to retrieve the desired formatting information.

The database query tools 150 are one or more tools used to generate query instructions and to generate a context for the generative AI model 190. The ensemble tool model 180 organizes the database query tools 150. The ensemble tool model 180 and the database query tools 150 are described together below, as the components 150-180 may be in greater or fewer components, may be combined into a single component while depicted as separate components, and are otherwise related. For example, the ensemble tool model 180 may select the database query tool 150 to be applied to generate a context or to otherwise process an input in a natural language.

The database query tools 150 are depicted as including a natural language processing (NLP) model 155, a list table tool 160, a schema information (info) tool 165, and a verify tool 170. To note, more tools may exist, or the tools may exist in more or fewer components than as depicted in FIG. 1. The NLP model 155 processes a natural language input to generate query instructions. The list table tool 160 accesses the stored table description 140 to list the table names of the tables in the data warehouse. The schema info tool 165 accesses the stored table description 140 to retrieve the stored schema of one or more identified tables. The verify tool 170 verifies whether a query instruction set is valid (such as does not generate any errors when executed in a sandbox or is otherwise tested).

In some implementations, the generative AI model 190 is a generative pre-trained transformer (GPT) model, such as GPT-3 or GPT-4. For example, the generative AI model 190 may be the GPT-4 model from OpenAIR®. In such an example, the system 100 may interface with the API for the generative AI model 190 to provide inputs and context to the model and to receive responses from the model. Alternatively, the generative AI model 190 may be a GPT model that is local to the system 100. For example, if the system 100 is managed by Intuit®, the generative AI model 190 may be included in GenStudio (a generative AI lab), which may be included in the system 100 or directly interfacing with the system 100.

Since the system 100 is not trained based on knowledge of the actual contents of the data warehouse, the generative AI model 190 is used to evolve the natural language request input by a user or another device over iterations in order to break down the overall request into step-by-step instructions. For example, referring back to the previous example of a natural language request of "What is the average high temperature of city X in August over the last five years?," the step-by-step instructions may include: (i) identify the table(s) in the data warehouse to be used; (ii) identify the table entries in the identified table(s) to be used; (iii) identify the operation(s) to be performed on the identified table(s); and (iv) generate the query instructions to retrieve the specific entries of the specific table(s) and perform the operation(s) on the entries. The iterations to perform such operations using the stored table description 140, as well as additional details regarding the components 150-180, are described in more detail below with reference to FIG. 2.

To note, while the components 150-180 are depicted as separate components of the system 100 in FIG. 1, the components 150-180 may be included in software including instructions stored in memory 135 or the database 120, may include application specific hardware (e.g., one or more ASICs), or a combination of the above. As such, the particular architecture of the system 100 shown in FIG. 1 is but one example of a variety of different architectures within which aspects of the present disclosure may be implemented. In addition, in other implementations, components of the system 100 may be distributed across multiple devices, may be included in fewer components, and so on. For example, while the ensemble tool model 180 and the NLP model 155 are depicted as separate components, the models 155 and 180 may be included in a single component. While the examples herein are described with reference to system 100, any suitable system may be used to perform the operations described herein. If the components are software, the components may be implemented using any suitable computer-readable language. For example, one or more of the components 150-180 and the configuration and interoperability of such components may be programmed in the Python programming language using any suitable libraries.

Figure 2:
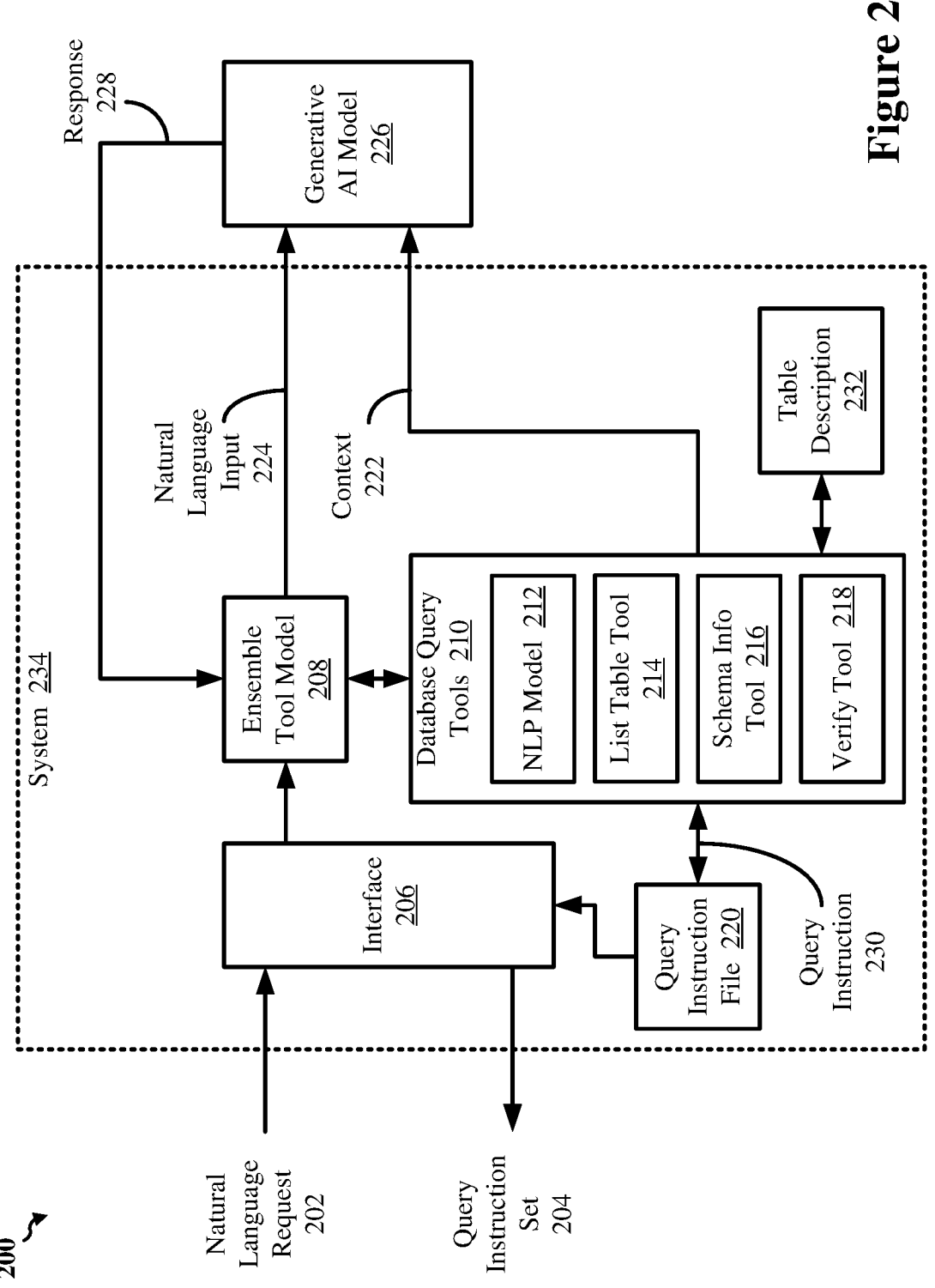
FIG. 2 shows an example block diagram for generating a query instruction set from a natural language request, according to some implementations.

Referring now to FIG. 2 to explain the components and aspects of system 100 in FIG. 1, FIG. 2 shows an example block diagram 200 for generating a query instruction set 204 from a natural language request 202, according to some implementations. The system 234 in the block diagram 200 may be an example implementation of the system 100 depicted in FIG. 1. As such, in block diagram 200, the interface 206 may be an example implementation of the interface 110, the ensemble tool model 208 may be an example implementation of the ensemble tool model 180, the database query tools 210 may be an example implementation of the database query tools 150, and the table description 232 may be an example implementation of the table description 140. In the database query tools 210, the NLP model 212 may be an example implementation of the NLP model 155, the list table tool 214 may be an example implementation of the list table tool 160, the schema info tool 216 may be an example implementation of the schema info tool 165, and the verify tool 218 may be an example implementation of the verify tool 170. The generative AI model 226 is depicted as being separate from the system 234, but as noted above, in some implementations, the generative AI model 226 may be included in the system 234.

The system 234 is able to generate the query instruction set 204 from the natural language request 202 by using the stored table description 232 and without accessing the data warehouse. FIG. 3 shows an illustrative flow chart of an example operation 300 of generating a query instruction set 204 from a natural language request 202, according to some implementations. The example operation 300 is described as being performed by the computing system 100 to generate a query instruction set for clarity, with the configuration of the components depicted in the block diagram 200 being used as an example implementation of the system 100.

At 302, the system 234 stores, in a local storage, a table description 232 of a plurality of tables stored in a remote data warehouse. For example, the table description may be a file or files stored in the database 120 or another suitable storage of the system 100. At 304, the interface 206 obtains a natural language query 202 as an input for querying the remote data warehouse. For example, a user may use a prompt of the system 234 to type or otherwise input a natural language request 202. Alternatively, an application programming interface (API) may be used to input the natural language request 202 from another device (such as from a user's personal device communicating with the system 234).

At 306, the system 234 generates, using one or more database query tools 210, a final query instruction set 204 for querying the remote data warehouse from the natural language query 202 based on the stored table description 232. For example, the ensemble tool model 208 and the NLP model 212 may parse the natural language request and additional natural language inputs to generate query instructions 230 based on the use of the other database query tools 210 and the stored table description 232. Additional details regarding the generation of such query instructions are described in more detail below with reference to FIG. 2 and FIGS. 4-7. To note, the one or more database query tools 210 (as well as the system 234 itself) are prevented from accessing the remote data warehouse to generate the final query instruction set (308). In this manner, the system 234 does not access any contents of the data warehouse, thus allowing the contents to remain private from the system 234 or other devices in communication with the system 234. At 310, the system 234 outputs, via the interface 206, the final query instruction set 204. For example, the system 234 may display the final query instructions to the user via a display. Additionally or alternatively, the system 234 may output a text file or another suitable formatted file including the query instructions so that a user may separately have the instructions executed to query the data warehouse to fulfill the user's natural language request 202.

Referring back to FIG. 2, while the ensemble tool model 208 and the NLP model 212 are depicted as separate components in explaining aspects of the operations to be performed by the system to convert natural language requests to query instruction sets, in some implementations, the ensemble tool model 208 and the NLP model 212 are included in the same component. For example, the ensemble tool model 208 and the NLP model 212 may be parser tools to parse natural language inputs and may be implemented as a component in the LangChain framework. The LangChain framework allows outputs to be in a suitable format, such as query instructions in an SQL format. The other database query tools 214-218 may be implemented as tools accessible in the LangChain framework in order to generate outputs in a suitable format for either generating query instructions or generating context to be provided to the generative AI model 226. A model or component in the LangChain framework is referred to herein as a LangChain model (such as the ensemble tool model 208 and the NLP model 212 together being a LangChain model).

To generate the LangChain model, a base prompt template is provided to the LangChain framework outlining specific rules that the model is to follow in converting natural language requests to query instruction sets. The base prompt template may be organized to prevent the query instruction set from causing too much information to be queried (which may require too much time or processing resources), to prevent changes from being made to the contents of the data warehouse, to prevent unrecognized tools from being used, or provide other directives in generating the query instruction set. An example base prompt template to the LangChain framework is provided below. The LangChain model is to generate a Spark SQL query instruction set from a natural language request. Comments regarding the base prompt are provided in brackets [ ].

"You are an agent designed to generate Spark SQL queries. Given an input question, create a syntactically correct Spark SQL query to run. Then always query using query_sql_db to see if the query run successfully. [query_sql_db may be a verification tool coupled to the Lang-Chain framework] Unless the user specifies a specific number of examples they wish to obtain, always limit your query if asked. You can order the results by a relevant column to return the most interesting examples in the database. Never query for all the columns from a specific table, only ask for the relevant columns given the question. You have access to tools for interacting with the database. [With the tools simulating access to the data warehouse based on a stored table description] When rewrite the query, always check the query first with query_sql_db. [Thus always verify the query instructions] Only use the below tools. Only use the information returned by the below tools to construct your final answer. [The database query tools are introduced after the base prompt] You MUST double check your query before executing it. If you get an error while executing a query, rewrite the query and try again. DO NOT make any DML statements (INSERT, UPDATE, DELETE, DROP etc.) to the database. DO NOT use DATE_SUB or DATE_ADD. [certain query instructions are prohibited] If the question does not seem related to the database, just return 'I don't know' as the answer. [thus giving an option if unable to generate a valid query instruction set]"

Referring back to FIG. 2, the ensemble tool model 208 in combination with the NLP model 212 (e.g., the LangChain model) parses a natural language request 202 received via the interface 206 and, based on the parsing, selects the database query tool (such as the list table tool 214) to retrieve information regarding the data warehouse from the stored table description 232 (such as from the database 120 of the system 100 storing the table description 140). The ensemble tool model 208 and the NLP model 212 are also configured to parse responses 228 from the generative AI model 226. Such feedback of responses 228 from the generative AI model back to the ensemble tool model 208 (such as to the LangChain model) and then provision of a new natural language input 224 to the generative AI model 226 allows the system 234 to iteratively parse new natural language inputs based on the generative AI model 226.

Since the system 234 does not access the contents of the data warehouse and instead relies on the stored table description 232 to generate the query instruction set 204, the iterations of parsing natural language inputs through the feedback from the generative AI model 226 allows the system 234 to generate query instructions 230 of the query instruction set 204 by breaking the overall request 202 into step-by-step requests that can logically be viewed as a procedure converted into a sequence of query instructions 230.

In iteratively parsing natural language inputs to generate the final query instruction set 204 (which is provided to the query instruction file 220 and provided to a user or device via the interface 206), the responses 228 from the generative AI model are considered modified inputs (with the natural language request 202 being the original input) that are again provided back to the generative AI model 226 as the natural language input 224 (with additionally generated context 222). Such feedback may continue to occur until the query instruction set 204 is generated and verified using the data query tools 210. In particular, the system 234 generates context 222 to include with an input 224 to the generative AI model 226, the generative AI model 226 generates a response 228, and the response 228 is parsed to generate a new context 222 to provide to the generative AI model 226. The response 228 is also provided as a new/modified input 224. Over a plurality of iterations between the system 234 and the generative AI model 226, the system 234 is able to use the stored table description 232 (which indicates table names and schemata) without accessing the remote data warehouse in order to generate the query instruction set 204 for querying the remote data warehouse.

Context as used herein may refer to an output of one or more of the database query tools or a parsing model (such as the LangChain model) that may assist the generative AI model 226 in providing a response 228 that assists the system 234 in determining a next step to be performed in the query instructions. The context may include the results of applying a database query tool, the operation or database query tool applied, and/or a query instruction generated based on parsing an input. For example, in some examples of the NLP model 212 and the ensemble tool model 208, the NLP model 212 tokenizes and vectorizes the natural language request 202 into a representative vector. The vector may then be used by the ensemble tool model 208 to identify the database query tool 210 to be used or the query instruction to be executed to perform part of the query requested in the natural language request. For example, referring back to the previous example of a natural language request of "What is the average high temperature of city X in August over the last five years?," the NLP model 212 may generate a vector of the request including the token "city X." For the first pass, and with the table names in the data warehouse being locations (including city X), the ensemble tool model 208 may select the list table tool 214 to be applied to the table description 232, thus retrieving the table names stored in the table description 232. The NLP model 212 or the ensemble tool model 208 may thus compare the tokens of the vector to the table names to identify a match of "city X" and that the table name including "city X" is to be used in the data warehouse query. The table name may be output by the list table tool 214 (such as by the LangChain model executing the list table tool 214) as the context 222. In this manner, the system 234 provides the natural language request 202 as the natural language input 224 and the context 222 generated by the data query tool to the generative AI model 226 to generate a response 228. In some examples, the context may also include the tool 210 applied or the call to such tool. To note, the system 234 is configured to format the context 222 in a suitable format to be ingested by the generative AI model 226.

With the input 224 of "What is the average high temperature of city X in August over the last five years?" and a context 222 that a table in the data warehouse with a table name "City X" is to be accessed, the generative AI model 226 may generate a response 228 of "Look at the schema of the City X table to see what table information is to be used." An additional iteration may then be performed of parsing the response 228 to determine a next step in the request. To note, in some implementations, the NLP model 212 (such as the LangChain model) generates query instructions 230 in a piecewise manner over a plurality of iterations until the query instruction file 220 includes the query instruction set 204. For example, if a first iteration indicates that the table having the table name of "city X" is to be accessed in the above example, the LangChain model may generate a query instruction 230 to access the table with the table name "city X." Additional query instructions 230 may then be added in additional iterations.

FIG. 4 shows an illustrative flow chart of an example operation 400 to be iteratively performed in generating a query instruction set 204 from a natural language request 202, according to some implementations. The example operation 400 is described as being performed by the computing system 100 to generate a query instruction set for clarity, with the configuration of the components depicted in the block diagram 200 being used as an example implementation of the system 100. The example operation 400 may be performed in addition to the example operation 300 to generate the query instruction 204. For example, step 306 of generating the final query instruction set in operation 300 may include a plurality of iterations of operation 400. As noted above, operation 400 is depicted as being iterative, and operation 400 ends when the final query instruction set 204 is completed. For example, when the query instruction file 220 includes the query instruction set 204, no further iterations of operation 400 are performed, with the query instruction set 204 output from the file 220 via the interface 206.

At 402, the system 234 generates a context 222 from an input using one or more database query tools 210 based on the stored table description 232. As noted above, for the first iteration, the natural language request 202 is the input from which the context 222 is generated. For example, the LangChain model may parse the request 202, select the list table tool 214 to be applied, apply the list table tool 214, and identify that the table named "city X" is to be accessed for carrying out the request 202. As such, the context 222 for the first iteration may be "city X table." In some implementations, the context 222 may be text included in a text file or other object, and the text may be retrieved from the object and provided to the generative AI model 226 when providing the natural language input 224. The context 222 in the first iteration may be output by the list table tool 214 or by the parsing model (such as the LangChain model) that identifies the matching name between the token vector of the request 202 and the list of table names provided by the list table tool 214 from the table description 232.

At 404, the system 234 provides the input 224 and the context 222 to the generative AI model 226. For example, in the first iteration, the natural language request 202 and the context 222 of the table name may be provided to the generative AI model 226. Providing the input and context to the generative AI model 226 may be via an API of the model 226. As such, the system 234 is configured to format the input 224 and the context 222 in order for the model 226 to properly receive the input and context via the API.

At 406, the system 234 receives an intermediate input in a natural language from the generative AI model 226 based on the input 224 and the context 222. In particular, the generative AI model 226 may be a large language model (LLM) that generates a response 228 in a natural language based on the natural language input 224 and the context 222 input to the generative AI model 226. The response 228 is the intermediate input in step 406. To note, the intermediate input is a new input from which a new context 222 is to be generated using the one or more database query tools 210 during a next iteration (408). For example, the ensemble tool model 208 and the NLP model 212 (such as a LangChain model or other parsing model) may parse the response 228 and use one or more of the database query tools 210 to generate a new context 222.

Referring back to the previous example of the original natural language request 202 being "What is the average high temperature of city X in August over the last five years?" and the context 222 associated with that request being "City X table" or "There is a city X table" (or similar based on the system 234 formatting the context 222), the response 228 may be "Look at the schema of the City X table to see what table information is to be used." The parsing model parses the response. Based on the database query tools available, the parsing model may identify that the schema info tool 216 is to be applied. For example, a token vector generated from the response 228 may include the token "schema," which may be included in a list of tokens associated with one or more of the database query tools (such as schema, schemata, table info, or similar being tokens associated with the schema info tool 216). Additionally or alternatively, the schema info tool 216 may be selected after the tables to be accessed are identified in a previous iteration. For example, if a previous iteration included the selection and application of the list table tool 214 to identify one or more tables, the next iteration may include the selection and application of the schema info tool 216 to obtain the schema of the identified tables.

In the example, in a next iteration of operation 400, the system 234 (such as the LangChain model) selects and applies the schema info tool 216 defined for the city X table to the stored table description 232 in order to obtain the schema of the city X table as stored in the table description 232. As noted above, the table schema may include row names, column names, the type of data the table is to store, or other metadata of the table. For the city X table, the schema indicates that the columns represent different weather measurements, such as a column for low temperatures, a column for high temperatures, a column for measured humidity, and so on. The schema may also indicate that the rows represent different days, thus indicating that the weather measurements are daily measurements (such as a high temperature for a specific day based on the row, a low temperature for a specific day based on the row, and so on). Such schema information (and, optionally, the operation or tool used to obtain the schema information) may be provided as the new context 222 with the new input 224 of "Look at the schema of the City X table to see what table information is to be used" to the generative AI model 226.

In some implementations, the subsequent inputs and contexts provided to the generative AI model 226 are part of a same conversation. For example, for a new natural language request 202, the generative AI model 226 may begin a new conversation. Thus, the natural language request 202 as the first input 224 may be the first input of the conversation. The subsequent inputs may then be a continuation of the same conversation until the final query instruction set is generated. To note, in response to receiving a new natural language request 202, the system 234 may indicate to the generative AI model 226 (such as via an API) to begin a new conversation. The system 234 thus remains communicably coupled with the generative AI model 226 to continue the conversation through a plurality of iterations until the query instruction set 204 is complete.

Referring back to the previous example, the new input 224 of "Look at the schema of the City X table to see what table information is to be used" (with the new context 222 including the text describing the table schema of the City X table) is provided to the generative AI model as additional inputs to the same conversation. In this manner, the generative AI model 226 provides another response 228, such as "Find the specific column and rows of the City X table to be used." The system 234 (such as a LangChain model) parses the new response 228 in the next iteration of operation 400, and based on the parsing may identify the rows in the table corresponding to August for the last five years and the column corresponding to the high temperature measurement (such as based on the schema obtained for the table in the previous iteration, which may indicate the format of row names to identify the last five years and the month 08 and indicate the column name).

In some implementations, the identified rows and columns and the operation to be performed (an average, which may be defined in the LangChain framework or otherwise defined for the parsing model, such as including the NLP model 212) may be sufficient for the system 234 (such as the NLP model 212, which may be included in the LangChain model) to generate the query instructions of retrieving the contents of the cells of the intersection of the identified rows and column and averaging the cell contents to generate the desired answer. In some other implementations, with the rows and columns identified, the identified rows and columns may be a new context 222 and the response 228 of "Find the specific column and rows of the City X table to be used" from the previous iteration provided to the generative AI model 226 by the system 234 as part of the same conversation. In this manner, the generative AI model 226 may generate another response 228 of "Average the contents of the identified column at the identified rows." The system 234 may then parse the new response 228 in a next iteration to identify the operation to be performed.

As noted above, the NLP model 212 (such as the parsing model or the LangChain model) may generate query instructions 230 in a piecewise manner over a plurality of iterations. In the above example, with the first query instruction being to access the city X table, another query instruction may be to retrieve the cell contents at the identified rows and column (which may be generated in a later iteration). Another query instruction may be to average the retrieved cell contents (which may be generated in yet a later iteration). A final query instruction may be to output the average as an answer to the natural language request 202. The sequence of query instructions 230 may be stored in the query instruction file 220 in sequence when generated, and the complete sequence of query instructions may be output via the interface 206 when complete as the query instruction set 204.

In some implementations, for a query instruction set 204 to be complete, the query instruction set may be tested or otherwise verified to ensure that the sequence of query instructions are invalid or do not otherwise generate any errors. In the system 234, the verify tool 218 is the database query tool selected and executed by the ensemble tool model 208 when all of the query instructions 230 have been generated to verify the query instruction set. For example, when the system 234 identifies that the query instructions to perform the requests 202 have been generated and stored in the query instruction file 220, the system 234 may test the query instruction set in the query instruction file 220 by applying the verify tool to the query instructions in a sandbox based on the table description 232 to impersonate a data warehouse to execute the query instructions. Alternatively, any other suitable testing tool may be used to verify whether the query instruction set is valid. The verify tool 218 may be a debugger to attempt to identify location errors (such as nonexisting tables to be called or nonexisting cells to be retrieved (such as based on specific rows or columns not existing)) or operation errors (such as arithmetic errors, call errors, and so on). The verify tool 218 may also be configured to verify that the query instruction set does not include unwanted operations that modify the data warehouse (such as load content or save instructions to modify a data table or otherwise modify data stored in the data warehouse). If a query instruction set is found invalid by the verify tool 218, the system 234 is to continue using the generative AI model 226 and the database query tools 210 to update the query instruction set and thus correct the query instructions for errors.

For the LangChain model to verify a query instructions set, the base prompt template may include one or more additional prompts associated with verifying the query instruction set. For example, the base prompt template to the LangChain framework may further include, "Input to a query checker is a detailed and correct SQL query, output is a result from the Spark SQL. If the query is not correct, an error message will be returned. If an error is returned, rewrite the query, check the query, and try again." In this manner, the LangChain model is to be configured to verify and rewrite a query instruction set if any errors occur.

Figure 5:
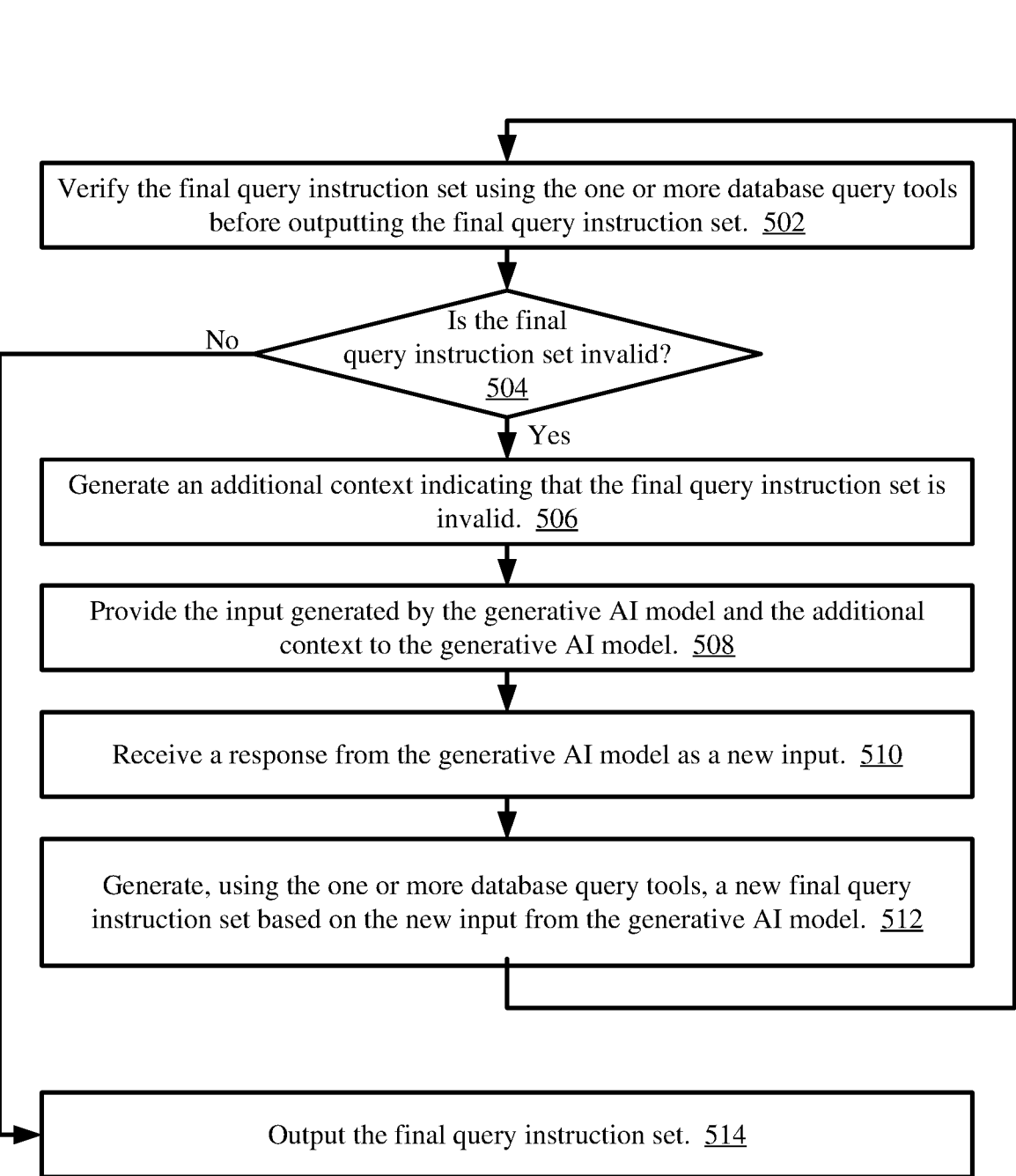
FIG. 5 shows an illustrative flow chart of an example operation of verifying and correcting a query instruction set using a generative artificial intelligence (AI) model, according to some implementations.

FIG. 5 shows an illustrative flow chart of an example operation 500 of verifying and correcting a query instruction set using a generative AI model, according to some implementations. The example operation 500 is described as being performed by the computing system 100 to verify and correct a query instruction set for clarity, with the configuration of the components depicted in the block diagram 200 being used as an example implementation of the system 100. The example operation 500 may be performed in addition to the example operation 300 and the example operation 400 to generate the query instruction 204. For example, step 306 of generating the final query instruction set in operation 300 may include operation 500 after the plurality of iterations of operation 400. As noted above, operation 400 is depicted as being iterative, with operation 400 ending when the final query instruction set 204 is completed. Operation 500 may be performed at or subsequent to a final iteration of operation 400.

At 502, the system 234 verifies the final query instruction set using the one or more database query tools 210 before outputting the final query instruction set 204. Thus, before performing step 310 of outputting the final query instruction set in operation 300, the system 234 verifies the final query instruction set to be valid. To verify whether the final query instruction set is valid, the ensemble tool model 208 (such as the LangChain model) may select and apply the verify tool 218 to the query instruction file 220. As noted above, the system 234 applying the verify tool 218 may identify whether any query instructions cause errors, such as calling unknown cells, performing operations on unknown contents, etc., based on the table description 232 indicating the formatting of the tables and the data warehouse. In some implementations, the verify tool 218 generates an error report, with an error indicating the location of the error in the query instruction set and the type of error.

At decision block 504, if the final query instruction set 204 is valid (such as no errors being generated in response to applying the verify tool 218 to the query instruction file 220), then the system 234 outputs the final query instruction set 204 (514). If the final query instruction set 204 is invalid at decision block 504 (such as one or more errors being generated in response to applying the verify tool 218 to the query instruction file 220), the process proceeds to block 506. At 506, the system 234 generates an additional context 222 indicating that the final query instruction set is invalid. For example, the context 222 may include the error report or information regarding the errors generated by applying the verify tool 218 (with the context 222 optionally formatted in a format suitable for the generative AI model 226).

At 508, the system 234 provides the input generated by the generative AI model 226 (i.e., the previous response 228) and the additional context 222 (e.g., the error report) to the generative AI model 226. For example, in the previous example, the last response 228 from the generative AI model 226 may be "Average the contents of the identified column at the identified rows." The last response 228 is provided back to the generative AI model 226 as the input 224. The input 224 may also include a natural language indication that an error exists. For example, if application of the verify tool 218 generates one or more errors, the system 234 may be configured to include a form sentence of "There is one or more errors in the query instructions." In some implementations, the input 224 may also include a portion or all of the query instruction set that was tested.

The new input 224 and context 222 provided to the generative AI model 226 are part of the same conversation of the previous inputs for the natural language response. As such, based on the conversation history and the inputs and context, the generative AI model 226 generates a new natural language response 228 to assist in correcting the query instruction set. At 510, the system 234 receives the response 228 from the generative AI model 226 as a new input (such as to the LangChain model or parsing model to parse the response 228). At 512, the system 234 generates, using the one or more database query tools 210, a new final query instruction set based on the new input from the generative AI model 226. To continue the previous example, the error report may indicate one error of a nonexistent cell or undefined variable for a cell for one of the cells from the City X table that is to be averaged. As such, the response 228 may be "Remove the unknown value from the average." The parsing model may parse the response 228 and generate a new query instruction to average the contents of the cells identified but with the cell causing the error missing from the equation. With the error report indicating the query instruction causing the error, the system 234 may replace the indicated query instruction in the query instruction file 220 with the new query instruction. If the error report included additional errors, such may be included in the previous context 222 and responded to in the response 228. As such, more than one query instruction may be generated and replace an existing, error causing query instruction in the file 220 as a result of the response 228. In the example, once the indicated query instructions are replaced, the update query instruction file 220 includes the new final query instruction set.

After 512, the process reverts back to block 502, and the system 234 verifies the new final query instruction set (such as by again applying the verify tool 218 to the query instruction file 220). Blocks 502 through 512 may repeat until the final query instruction set is not invalid at decision block 504 (such as by the verify tool 218 not generating any errors). As such, the system 234 outputs the query instruction set 204 for which no errors were generated by the verify tool 218.

While not depicted in FIG. 5, in some implementations, the system 234 may time out from attempting to correct the final query instruction set. For example, after a threshold number of iterations of blocks 502-512 or after a threshold amount of time counted by the system 234 in a timer since first verifying the final query instruction set, the system 234 may prevent further attempts from verifying the query instruction set. The system 234 may indicate to a user that an error occurred or that the system 234 was unable to generate the query instruction set. As such, the system 234 may request the user to reword the request. Alternatively, the system 234 may repeat the original natural language request 202 as being received as a new request. In this manner, the generative AI model 226 may use a new conversation to handle the new natural language inputs 224 and contexts 222. The new responses 228 from the generative AI model 226 in the new conversation will differ from the previous responses in the previous conversation. As such, the system 234 may be successful in generating and outputting the query instruction set 204 in an attempt subsequent to the previous failed attempt.

Figure 6:
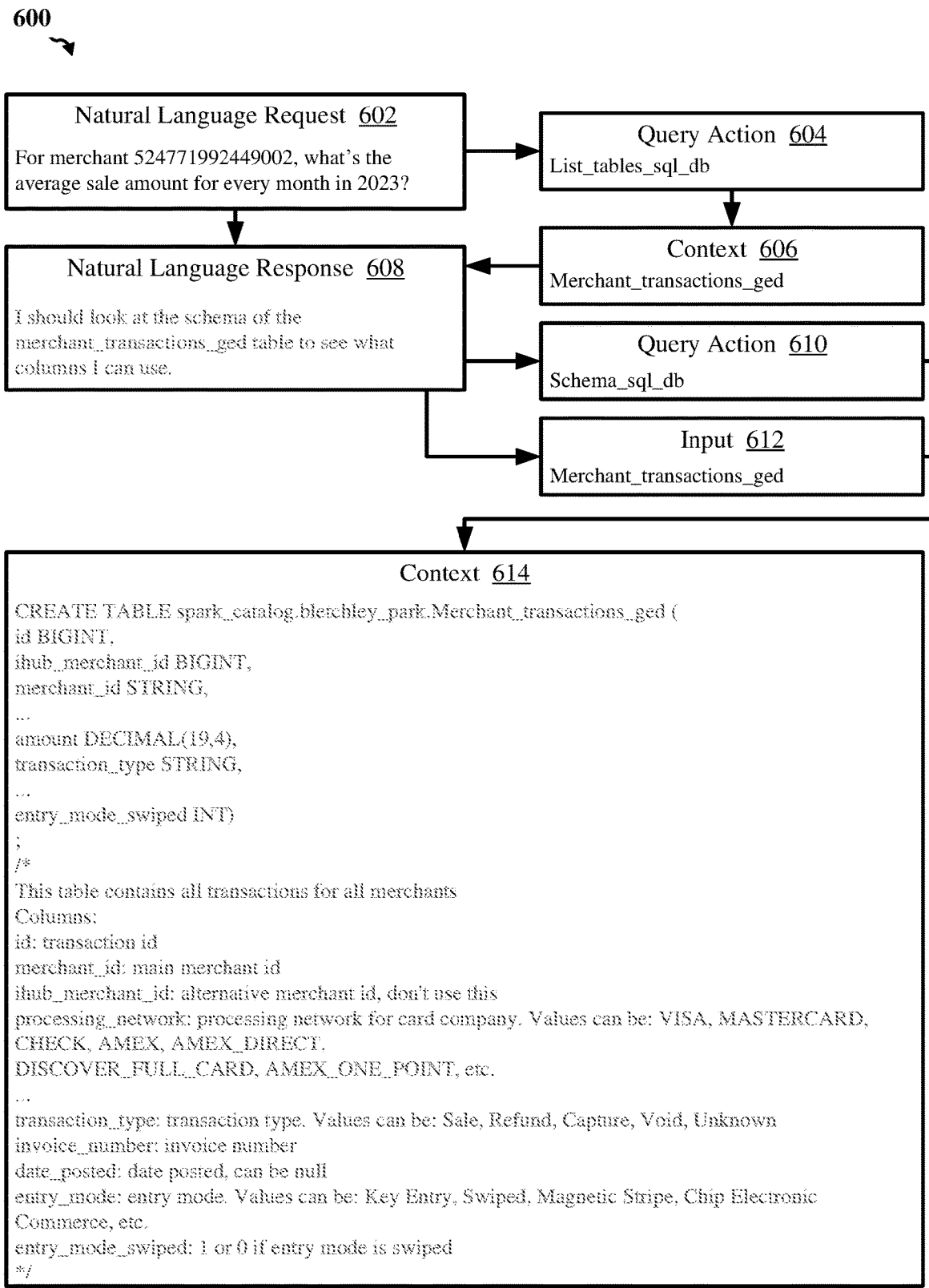
FIG. 6 shows an example process of a natural language request being converted to a query instruction set.

In referring to a different example to depict the operations of generating a query instruction set from a natural language request, FIG. 6 shows a process 600 of a natural language request 602 being converted to a query instruction set 620. The process 600 is described as being performed by the system 100 in FIG. 1 using a LangChain model, with the configuration of components as depicted in the system 234 in FIG. 2 being referred to for clarity. In the example, the remote data warehouse stores merchant information for a plurality of merchants. For example, Intuit® Quickbooks® (QBO) is used by a large mass of businesses, and Intuit may house an internal data warehouse to store merchant information received via QBO, such as the merchant profile, transactions reported in QBO, and so on. Some of the stored information may include information that merchants desire to keep confidential or otherwise hidden from others. As such, specific merchant contents in the data warehouse are not to be divulged outside of the merchant and those within Intuit to which the merchant agrees may have access to the information (such as a client account specialist). If a merchant calls the client account specialist to request specific information regarding the merchant (such as "how much in sales did the merchant make in the last fiscal year," "what were the expenses incurred in January of last year," or "what was the best month in sales over the last three years"), traditionally, the client account specialist would need sufficient knowledge of SQL to generate the query instruction set for the request, or the client account specialist would need to task a technical support member to generate the query instruction set and work with such member if any issues occur in the query instructions without divulging the results or contents of the data warehouse specific to the merchant. As such, the system 234 stores the table description 232 that includes the formatting information of the data warehouse (such as the table names and table schemata) without storing the actual contents of the data warehouse.

In the specific example depicted in FIG. 6, the merchant associated with the unique identifier (ID) "524771992449002" (which may be assigned when generating a QBO profile or otherwise signing up for services) wishes to know his average amount in sales for each month in 2023. As such, the client support specialist may enter via the interface 206 the natural language request 602 of "For merchant 524771992449002, what's the average sale amount for every month in 2023?" The LangChain model receives the natural language request and parses the request to identify the query action 604 to be performed to be "list_tables_sql_db" (i.e., selecting the list table tool 214). As noted above, in some implementations, selecting the list table tool 214 may be based on this being the first iteration. In some implementations, the data warehouse may be organized such that a table corresponds to merchant transactions across one or more merchants. For example, the data warehouse may include a "Merchant_transactions_ged" named table for merchant transaction genealogy data. Thus, based on parsing the request 602 that identifies the merchant and that sales (which may be associated with transactions in terms of similar tokens) are of interest and listing the table names stored in the table description 232 using list table tool 214, the LangChain model may identify the "Merchant_transactions_ged" table to be used in querying the data warehouse. As such, the LangChain model may generate the context 606 as "Merchant_transactions_ged", which may be formatted in providing to the generative AI model to indicate that "Merchant_transactions_ged" is the table name.

The system 234 provides the natural language request 602 and the context 606 to the generative AI model 226, which generates the natural language response "I should look at the schema of the merchant_transactions_ged table to see what columns I can use." The LangChain model parses the response 608 and select the "schema_sql_db" query action 610 (i.e., selecting the schema info tool 216). As noted above, in some implementations, selecting the schema info tool 216 may be based on being the iteration after the iteration in which the list table tool 214 is applied. Alternatively, the schema info tool 216 selection may be based on the LangChain model parsing the response 608 to identify the "schema" token associated with the schema info tool 216. In addition, the LangChain model provides the input 612 for the "schema_sql_db" query action 610 as "Merchant_transactions_ged" based on context 606 to indicate which table schema is to be retrieved via query action 610.

Applying the "schema_sql_db" query action 610 for the "Merchant_transactions_ged" table to the stored table description 232, the system 234 retrieves the table schema and generates the context 614. To note, the query instructions in the context 614 may be to create an object for accessing and retrieving cell values from the "Merchant_transactions_ged" table for manipulation. The comments offset by "/*" and "*/" in the context 614 may be comments in the stored table description for the schema of the "Merchant_transactions_ged" table. As such, the comments provide context to the generative AI model 226 as to the contents of the "Merchant_transactions_ged" table. In this manner, the generative AI model 226 may be apprised as to the layout of the table, including the type of data organized by column and by row.

The system 234 provides the context 614 and the natural language response 608 as an input 224 to the generative AI model 226, and the generative AI model 226 generates the natural language response 616 of "I should query the Merchant_transactions_ged table to get the average sale amount for every month in 2023 for merchant 5247719924490023." The LangChain model parses the response 616 to select the query action 618 of "query_sql_db". While not depicted in FIG. 2, the "query_sql_db" action may correspond to a database query tool to generate the final query instructions based on the detailed response from the generative AI model 226. Such tool is included in the NLP model 212 or the parsing model as described above in generating the final query instruction set. In the example process 600, the LangChain model generates the final query instruction set 620. As depicted in the final query instruction set 620, the query instructions, if executed in accessing the data warehouse, cause the Merchant_transactions_ged table to be accessed for the specific merchant ID 5247719924490023, specific year 2023, and specific transaction type "sale" based on the requested query in the response 616. The final query instruction set 620 also groups units for averaging into months and for the operation to be performed for the month of values to be an average, with the plurality of averages sorted by date.

While not depicted in the example process 600, the system 234 may also apply the verify tool 218, such as calling the query action corresponding to the verify tool to be applied to the final query instruction set 620. If any errors are output from the query action, the errors may be provided as additional context 222 along with the response 616 as an input 224 to the generative AI model 226 to generate a new response and attempt to correct the final query instruction set 620. Once the final query instruction set 620 is verified as valid, the final query instruction set 620 may be output by the system 234 to the client account specialist. The client account specialist may thus execute the final query instruction set 620 to query the data warehouse and obtain the requested information for the merchant.

In reviewing the example process 600, the iterative parsing of natural language inputs and use of a generative AI model to generate additional natural language input for parsing allows the system to piecewise convert the original natural language request that indicates a specific operation (monthly sales average) for a specific merchant into a natural language input that additionally identifies the table of the data warehouse to be used and then additionally identifies the specific contents (by months, year, transaction type) of the identified table to be used to perform the specific operation. As such, once the generative AI model generates a natural language response in sufficient detail of indicating the location of data in the data warehouse as well as the operations to be performed on the data, the parsing model (such as the LangChain model) is able to complete the final query instruction set 620. To note, throughout the iterations, the stored table description 232 is used to cause more granularity in the natural language inputs/responses (such as identifying the table and table cells) without requiring access to the data warehouse or its contents.

As such, as described above, a system may be implemented to convert natural language requests into query instruction sets for querying a data warehouse, with the system not having to access the data warehouse to be trained or configured to generate query instruction sets or in the generation of the query instruction sets. Such generation of query instruction sets occurs through the iterative use of a generative AI model and database query tools to manipulate an overall natural language request into piecewise operations, as described herein. In this manner, a user is not required to know the query language to generate query instructions and the system is not required to access any sensitive information in the data warehouse to generate the query instruction set. As a result, data can be kept confidential and private while generating query instruction sets can be performed expeditiously without the need for manual intervention or expertise.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for converting a natural language query to computer readable instructions for generating computer readable instructions to query a data warehouse, the method comprising:

storing, in a local storage, a table description of a plurality of tables stored in a remote data warehouse;

obtaining, by an interface, a natural language query as an input for querying the remote data warehouse;

iteratively generating, using one or more database query tools in conjunction with a generative artificial intelligence (AI) model, a final query instruction set for querying the remote data warehouse from the natural language query based on the stored table description, wherein the one or more database query tools are prevented from accessing the remote data warehouse to generate the final query instruction set, the iteratively generating including, over a first iteration and at least one next iteration:

generating a context from a current input using one or more database query tools based on the stored table description, wherein the natural language query is the current input for the first iteration of the iteratively generating;

providing the current input and the context to the generative AI model;

receiving an intermediate input in a natural language from the generative AI model based on the current input and the context;

determining whether a threshold number of iterations or a threshold amount of time is reached, wherein determining whether the threshold number of iterations or the threshold amount of time is reached is performed concurrently with generating the context from the current input; and selectively ending the iterative generation based on whether the threshold number of iterations or the threshold amount of time is reached, the selective ending of the iterative generation including:

ending the iterative generation responsive to determining that the threshold number of iterations or the threshold amount of time is reached, wherein the final query instruction set is generated based on the intermediate input; and starting the next iteration responsive to determining that the threshold number of iterations or the threshold amount of time is not reached, wherein the intermediate input is used as the current input for the next iteration; and outputting, via the interface, the final query instruction set.

2. The method of claim 1, wherein iteratively generating the final query instruction set further includes:

providing the input or the intermediate input generated during a current iteration to a natural language processing (NLP) model; and generating, by the NLP model, a query instruction of the final query instruction set based on the provided input or intermediate input, wherein query instructions of the final query instruction set are generated in a piecewise manner over the first iteration and the at least one next iteration.

3. The method of claim 2, wherein the NLP model is trained to process the natural language query and inputs generated by the generative AI model to generate the query instructions based on the stored table description.

4. The method of claim 1, further comprising verifying the final query instruction set using the one or more database query tools before outputting the final query instruction set.

5. The method of claim 4, further comprising, in response to determining that the final query instruction set is invalid:

generating an additional context indicating that the final query instruction set is invalid;

during an additional iteration after a final iteration in which the final query instruction set is generated:

providing the intermediate input generated by the generative AI model during the final iteration and the additional context to the generative AI model; and receiving a new intermediate input from the generative AI model based on the intermediate input generated by the generative AI model during the final iteration and the additional context; and generating, using the one or more database query tools, a new final query instruction set based on the new intermediate input from the generative AI model during the additional iteration, wherein the new final query instruction set is output via the interface as the final query instruction set.

6. The method of claim 1, wherein the stored table description includes one or more files storing:

table names of the plurality of tables stored in the data warehouse; and table schemata of the plurality of tables stored in the data warehouse.

7. The method of claim 6, wherein generating the context from the input includes:

providing the input to an ensemble tool model, wherein the ensemble tool model organizes the one or more database query tools;

selecting, by the ensemble tool model, a database query tool of the one or more database query tools to be applied to the input based on content of the input;

applying, by the ensemble tool model, the selected database query tool;

generating, by the selected database query tool, the context based on the input; and outputting, by the selected database query tool, the context in a text form into a text file, wherein the context in the text form is pulled from the text file to provide to the generative AI model.

8. The method of claim 7, wherein the one or more database query tools include:

a table list tool to generate, as context, a list of table names of tables in the data warehouse based on the stored table description; and a schema information tool to generate, as context, a list of schema information of tables in the data warehouse based on the stored table description.

9. The method of claim 8, wherein the one or more database query tools further include a query instruction set verification tool to verify the final query instruction set and indicate, as context, whether the final query instruction set is valid.

10. A system for converting a natural language query to computer readable instructions for generating computer readable instructions to query a data warehouse, the system comprising:

one or more processors;

an interface;

one or more database query tools; and a memory storing:

a table description of a plurality of tables stored in a remote data warehouse; and instructions that, when executed by the one or more processors, causes the system to perform operations comprising:

obtaining, by the interface, a natural language query as an input for querying the remote data warehouse;

iteratively generating, using one or more database query tools in conjunction with a generative artificial intelligence (AI) model, a final query instruction set for querying the remote data warehouse from the natural language query based on the stored table description, wherein the one or more database query tools are prevented from accessing the remote data warehouse to generate the final query instruction set, the iteratively generating including, over a first iteration and at least one next iteration:

generating a context from a current input using one or more database query tools based on the stored table description, wherein the natural language query is the current input for the first iteration of the iteratively generating;

providing the current input and the context to the generative AI model;

receiving an intermediate input in a natural language from the generative AI model based on the current input and the context;

determining whether a threshold number of iterations or a threshold amount of time is reached, wherein determining whether the threshold number of iterations or the threshold amount of time is reached is performed concurrently with generating the context from the current input; and selectively ending the iterative generation based on whether the threshold number of iterations or the threshold amount of time is reached, the selective ending of the iterative generation including:

ending the iterative generation responsive to determining that the threshold number of iterations or the threshold amount of time is reached, wherein the final query instruction set is generated based on the intermediate input; and starting the next iteration responsive to determining that the threshold number of iterations or the threshold amount of time is not reached, wherein the intermediate input is used as the current input for the next iteration; and outputting, via the interface, the final query instruction set.

11. The system of claim 10, further comprising a natural language processing (NLP) model to generate query instructions in a format readable by the data warehouse, wherein iteratively generating the final query instruction set further includes:

providing the input or the intermediate input generated during a current iteration to the NLP model; and generating, by the NLP model, a query instruction of the final query instruction set based on the provided input or intermediate input, wherein query instructions of the final query instruction set are generated in a piecewise manner over the first iteration and the at least one next iteration.

12. The system of claim 11, wherein the NLP model is trained to process the natural language query and inputs generated by the generative AI model to generate the query instructions based on the stored table description.

13. The system of claim 10, wherein the operations further comprise verifying the final query instruction set using the one or more database query tools before outputting the final query instruction set.

14. The system of claim 13, wherein the operations further comprise, in response to determining that the final query instruction set is invalid:

generating an additional context indicating that the final query instruction set is invalid;

during an additional iteration after a final iteration in which the final query instruction set is generated:

providing the intermediate input generated by the generative AI model during the final iteration and the additional context to the generative AI model; and receiving a new intermediate input from the generative AI model based on the intermediate input generated by the generative AI model during the final iteration and the additional context; and generating, using the one or more database query tools, a new final query instruction set based on the new intermediate input from the generative AI model during the additional iteration, wherein the new final query instruction set is output via the interface as the final query instruction set.

15. The system of claim 10, wherein the stored table description includes one or more files storing:

table names of the plurality of tables stored in the data warehouse; and table schemata of the plurality of tables stored in the data warehouse.

16. The system of claim 15, further comprising an ensemble tool model to organize the one or more database query tools, wherein generating the context from the input includes:

providing the input to the ensemble tool model;

selecting, by the ensemble tool model, a database query tool of the one or more database query tools to be applied to the input based on content of the input;

applying, by the ensemble tool model, the selected database query tool;

generating, using the selected database query tool, the context based on the input; and outputting, by the selected database query tool, the context in a text form into a text file, wherein the context in the text form is pulled from the text file to provide to the generative AI model.

17. The system of claim 16, wherein the one or more database query tools include:

a table list tool to generate, as context, a list of table names of tables in the data warehouse based on the stored table description; and a schema information tool to generate, as context, a list of schema information of tables in the data warehouse based on the stored table description.

18. The system of claim 17, wherein the one or more database query tools further include a query instruction set verification tool to verify the final query instruction set and indicate, as context, whether the final query instruction set is valid.

* * * * *